(12) United States Patent
Bonakdarpour et al.

(10) Patent No.: US 12,308,445 B2
(45) Date of Patent: May 20, 2025

(54) METHODS OF PREPARING CATALYST MATERIALS

(71) Applicant: JOHNSON MATTHEY HYDROGEN TECHNOLOGIES LIMITED, London (GB)

(72) Inventors: Arman Bonakdarpour, Vancouver (CA); Lius Daniel, Vancouver (CA); Baizeng Fang, Vancouver (CA); Jonathan Sharman, Reading (GB); David Wilkinson, Vancouver (CA)

(73) Assignee: Johnson Matthey Hydrogen Technologies Limited, London (GB)

( * ) Notice: Subject to any disclaimer, the term of this patent is extended or adjusted under 35 U.S.C. 154(b) by 0 days.

(21) Appl. No.: 17/757,539

(22) PCT Filed: Feb. 11, 2021

(86) PCT No.: PCT/GB2021/050317
§ 371 (c)(1),
(2) Date: Jun. 16, 2022

(87) PCT Pub. No.: WO2021/161022
PCT Pub. Date: Aug. 19, 2021

(65) Prior Publication Data
US 2023/0019857 A1    Jan. 19, 2023

(30) Foreign Application Priority Data
Feb. 12, 2020  (GB) .................................... 2001890

(51) Int. Cl.
H01M 4/92    (2006.01)
H01M 4/88    (2006.01)
H01M 8/1004  (2016.01)

(52) U.S. Cl.
CPC ......... *H01M 4/926* (2013.01); *H01M 4/8807* (2013.01); *H01M 4/881* (2013.01); *H01M 4/8892* (2013.01); *H01M 8/1004* (2013.01)

(58) Field of Classification Search
CPC .... H01M 4/926; H01M 4/925; H01M 4/8807; H01M 4/8803; H01M 4/881; H01M 4/8892; H01M 4/92; H01M 8/1004
See application file for complete search history.

(56) References Cited

U.S. PATENT DOCUMENTS

RE37,307 E     8/2001  Bahar et al.
7,807,063 B2  10/2010  Liu et al.
(Continued)

FOREIGN PATENT DOCUMENTS

CN    103928691 A    7/2014
CN    108281675 A    7/2018
(Continued)

OTHER PUBLICATIONS

Kim, et al., "Novel ordered nanoporous graphitic C3N4 as a support for Pt—Ru anode catalyst in direct methanol fuel cell", J. Mater. Chem., vol. 17, pp. 1656-1659, 2007.
(Continued)

*Primary Examiner* — Raymond Alejandro
(74) *Attorney, Agent, or Firm* — BakerHostetler

(57) ABSTRACT

Methods of preparing catalyst materials are provided. The catalyst material comprise electrocatalyst particles, a support material, and graphitic carbon nitride. The methods comprise applying graphitic carbon nitride to a catalyst material precursor.

7 Claims, 6 Drawing Sheets

(56) References Cited

U.S. PATENT DOCUMENTS

| | | | |
|---|---|---|---|
| 7,867,669 B2 | 1/2011 | Liu et al. | |
| 2005/0238938 A1 | 10/2005 | Rajendran | |
| 2017/0354962 A1* | 12/2017 | D'Souza | C01B 3/40 |
| 2019/0076826 A1* | 3/2019 | Park | B01J 37/08 |

FOREIGN PATENT DOCUMENTS

| | | | |
|---|---|---|---|
| CN | 110224149 A | 9/2019 | |
| CN | 111129510 A | 5/2020 | |
| CN | 114534765 A | 5/2022 | |
| JP | 2005-539352 A | 12/2005 | |
| JP | 2007-175578 A | 7/2007 | |
| JP | 2019-29304 A | 2/2019 | |
| KR | 100866311 B1 | 11/2008 | |
| WO | 2004/025800 A2 | 3/2004 | |
| WO | 2012/080726 A1 | 6/2012 | |
| WO | 2013/045894 A1 | 4/2013 | |
| WO | 2015/040638 A1 | 3/2015 | |
| WO | 2015/145128 A1 | 10/2015 | |

OTHER PUBLICATIONS

Huang, et al., "Pt-Decorated 3D Architectures Built from Graphene and Graphitic Carbon Nitride Nanosheets as Efficient Methanol Oxidation Catalysts", Adv. Mater., vol. 26, pp. 5160-5165, 2014.

Lee, et al., "Polymeric graphitic carbon nitride nanosheet-coated amorphous carbon supports for enhanced fuel cell electrode performance and stability", Applied Catalysis B: Environmental, vol. 237, pp. 318-326, 2018.

Pinaud, et al., "Key Considerations for High Current Fuel Cell Catalyst Testing in an Electrochemical Half-Cell", Journal of The Electrochemical Society, vol. 164, No. 4, 2017.

Li Zesheng, et al., "Novel graphitic carbon nitride/graphite carbon/palladium nanocomposite as a high-performance electrocatalyst for the ethanol oxidation reaction", Electrochimica Acta, Elsevier, Amsterdam, NL, vol. 191, Jan. 19, 2016 (Jan. 19, 2016), pp. 606-615, XP029430162, ISSN: 0013-4686, DOI: 10.1016/J.ELECTACTA.2016.01.124 the whole document.

Wee, et al., "Fabrication methods for low-Pt-loading electrocatalysts in proton exchange membrane fuel cell systems", Journal of Power Sources, Elsevier SA, CH, vol. 165, No. 2, Feb. 28, 2007 (Feb. 28, 2007), pages; ISSN: 0378-7753, DOI; 10.1016/J.JPOWSOUR.2006.12.051 the whole document.

Mansor Noramalina, et al., "Graphitic Carbon Nitride as a Catalyst Support in Fuel Cells and Electrolyzers", Electrochimica Acta, Elsevier, Amsterdam, NL, vol. 222, Nov. 4, 2016 (Nov. 4, 2016), pp. 44-57, KP029870799, ISSN: 0013-4686, DOI: 10.1016/J.ELECTACTA.2016.11.008 the whole document.

\* cited by examiner

METHODS OF PREPARING CATALYST MATERIALS

FIELD OF THE INVENTION

The present invention provides a novel catalyst material, as well as a method of preparing the material. The catalyst material comprises an electrocatalyst and graphitic carbon nitride.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the ion-conducting membrane is proton conducting, and protons, produced at the anode, are transported across the ion-conducting membrane to the cathode, where they combine with oxygen to form water.

A principal component of the PEMFC is the membrane electrode assembly (MEA), which is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

The electrocatalyst layers also generally comprise a proton conducting material, such as a proton conducting polymer, to aid transfer of protons from the anode electrocatalyst to the ion-conducting membrane and/or from the ion-conducting membrane to the cathode electrocatalyst.

Conventionally, the membrane electrode assembly can be constructed by a number of methods. Typically, the methods involve the application of one or both of the electrocatalyst layers to an ion-conducting membrane to form a catalyst coated ion-conducting membrane. Subsequently, a gas diffusion layer is applied to the electrocatalyst layer. Alternatively, an electrocatalyst layer is applied to a gas diffusion layer to form a gas diffusion electrode, which is then combined with the ion-conducting membrane. A membrane electrode assembly can be prepared by a combination of these methods e.g. one electrocatalyst layer is applied to the ion-conducting membrane to form a catalyst coated ion-conducting membrane, and the other electrocatalyst layer is applied as a gas diffusion electrode.

The electrocatalyst layers generally comprise an electrocatalyst material comprising a metal or metal alloy suitable for the fuel oxidation or oxygen reduction reaction, depending on whether the layer is to be used at the anode or cathode. Electrocatalysts for fuel oxidation and oxygen reduction are typically based on platinum or platinum alloyed with one or more other metals. The platinum or platinum alloy electrocatalyst can be in the form of unsupported nanometer sized particles (for example metal blacks) or can be deposited as discrete nanoparticles onto a support material (a supported electrocatalyst) leading to a very high surface area of electrocatalyst. Electrocatalysts can also be in the form of coatings or extended films deposited onto a support material. A wide range of catalysts concepts, such as Pt binary alloys, Pt monolayer electrocatalysts, Pt skin electrocatalysts, and nanostructured thin-film electrocatalysts have been investigated over the last decade. Another approach to high activity catalysts reported is that of the de-alloying Pt-M concept-materials obtained by the synthesis of base-metal (M) rich particles which are subjected to a selective leaching process of the less noble-metal from the particles.

There is a continual search for electrocatalysts, particularly oxygen reduction electrocatalysts, that have improved activity and/or stability, and that therefore utilise the expensive platinum electrocatalyst more effectively. This enables the membrane electrode assembly performance to be increased or the loading (and therefore cost) of the electrocatalyst employed in the membrane electrode assembly to be decreased, or a combination of both benefits.

One avenue of research involves the use of graphitic carbon nitride ($g\text{-}C_3N_4$) as a support material for platinum oxygen reduction reaction electrocatalysts. In this area, M. Kim et al. in J. Mater. Chem. 2007, 17, 1656-1659 have reported a Pt—Ru electrocatalyst for the anode of a direct methanol fuel cell supported on $g\text{-}C_3N_4$. Also, H. Huang et al. in Adv. Mater. 2014, 26 5160-5165 have reported Pt-decorated graphene and $g\text{-}C_3N_4$ sheets useful as methanol oxidation electrocatalyst. Additionally, I. Lee et al. in Appl. Catal. B: Environ. 2018, 237, 318-326 have reported an oxygen reduction reaction electrocatalyst comprising platinum dispersed on a support which has a core-shell structure in which carbon black particles are coated with a sheet of $g\text{-}C_3N_4$, and comprises at least 17 wt % $g\text{-}C_3N_4$.

SUMMARY OF THE INVENTION

Accordingly, in a first aspect the present invention provides a method of preparing a catalyst material which comprises, preferably consists essentially of, more preferably consists of (or comprises only), electrocatalyst particles, a support material, and graphitic carbon nitride, said method comprising the steps of:

(i) providing a catalyst material precursor comprising, preferably consisting essentially of, more preferably consisting of (or comprising only) electrocatalyst particles dispersed on a support material; then (ii) applying graphitic carbon nitride to the catalyst material precursor provided in step (i).

The term "catalyst material precursor" in this sense means materials from which the graphitic carbon nitride containing catalyst materials of the invention can be prepared. Such catalyst material precursors may have catalytic activity themselves and may be, for example, conventional catalyst materials comprising an electrocatalyst dispersed on a support material in the absence of graphitic carbon nitride. The catalyst material precursor does not comprise graphitic carbon nitride.

In a second aspect, the present invention provides a catalyst material obtainable by the method of the first aspect of the invention.

In a third aspect, the present invention provides a catalyst material comprising, preferably consisting essentially of, more preferably consisting of (or comprising only), electrocatalyst particles, a support material, and graphitic carbon nitride, wherein the electrocatalyst particles are dispersed on the support material, and wherein the catalyst material comprises no more than 5 wt % of graphitic carbon nitride by total weight of the graphitic carbon nitride and the support material.

It is surprising that the catalyst material of the invention, i.e. a catalyst material of the second or third aspects, or prepared by the first aspect, demonstrates improved electrochemical performance with respect to conventional catalyst materials which comprise electrocatalyst dispersed on a support material. In particular, it is surprising that the electrochemical performance of such conventional catalyst materials can be improved by applying graphitic carbon nitride to the catalyst material.

The invention also provides an electrocatalyst layer comprising a catalyst material of the invention.

The invention also provides a catalyst coated ion-conducting membrane comprising the electrocatalyst layer of the invention and an ion-conducting membrane.

The invention also provides a gas diffusion electrode comprising the electrocatalyst layer of the invention and a gas diffusion layer.

The invention also provides a membrane electrode assembly comprising the catalyst layer of the invention, the catalyst coated ion-conducting membrane of the invention, or the gas diffusion electrode of the invention.

The invention also provides a fuel cell comprising the electrocatalyst layer of the invention, the catalyst coated ion-conducting membrane of the invention, the gas diffusion electrode of the invention, or the membrane electrode assembly of the invention.

The invention also provides a catalysed decal transfer substrate comprising the electrocatalyst layer of the invention and a decal transfer substrate.

DETAILED DESCRIPTION OF THE INVENTION

Figure 1:
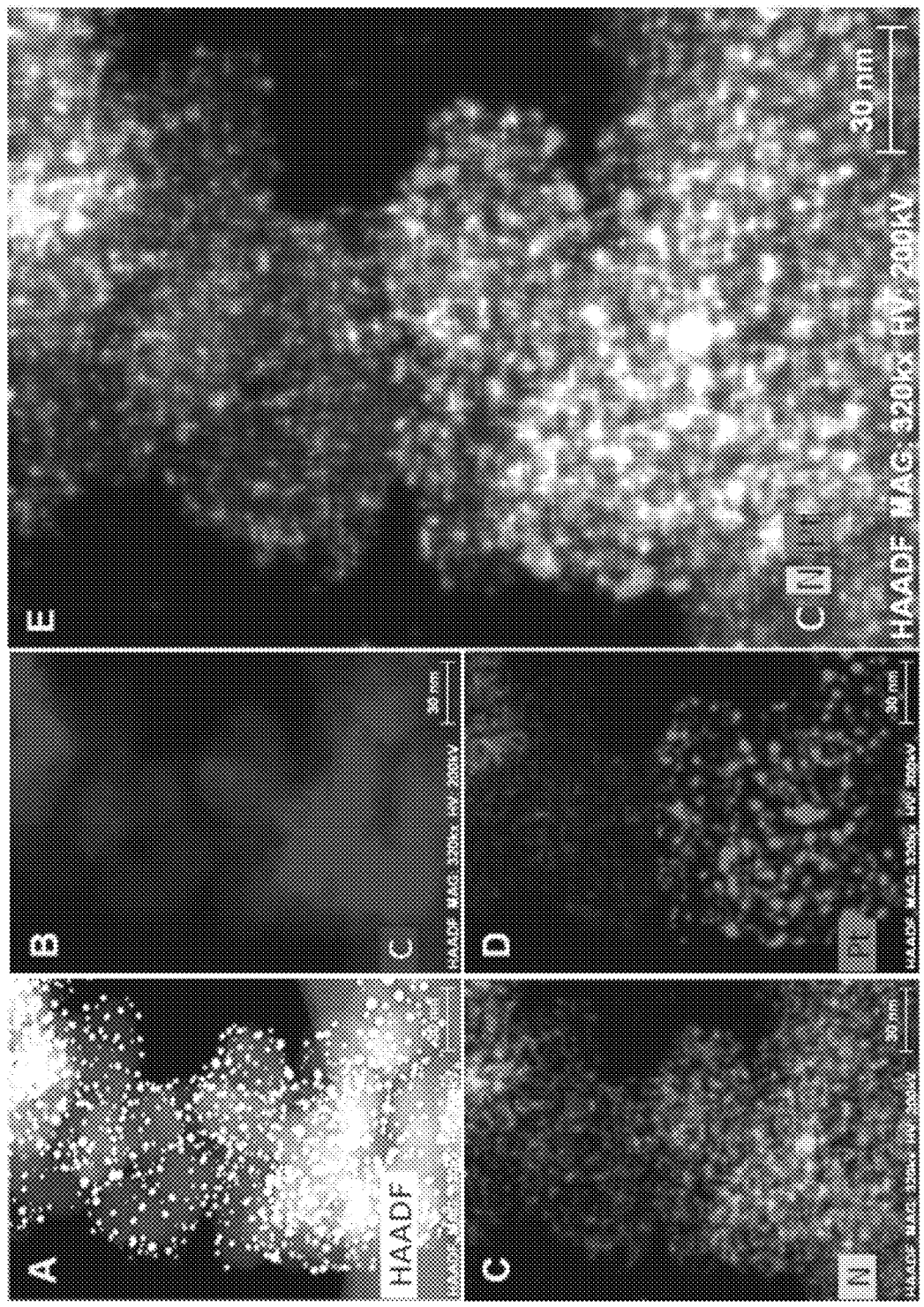
FIGS. 1A to E show energy dispersive X-ray spectroscopy (EDS) elemental mapping images of the Example 1 catalyst material.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise. References to the catalyst material of the invention include the catalyst material prepared by the method of the first aspect of the invention, as well as the catalyst materials of the second and third aspects of the invention.

The catalyst material of the invention comprises electrocatalyst particles, preferably nanoparticles. The exact electrocatalyst used will depend on the reaction it is intended to catalyse, and its selection is within the capability of the skilled person. The electrocatalyst may be a cathode or an anode electrocatalyst, preferably of a fuel cell, more preferably a proton exchange membrane fuel cell. The electrocatalyst is suitably selected from:
(i) the platinum group metals (platinum, palladium, rhodium, ruthenium, iridium and osmium);
(ii) gold or silver;
(iii) a base metal;
or an alloy or mixture comprising one or more of these metals or their oxides. A base metal is tin or a transition metal which is not a noble metal. A noble metal is a platinum group metal (platinum, palladium, rhodium, ruthenium, iridium or osmium) or gold. Preferred base metals are copper, cobalt, nickel, zinc, iron, titanium, molybdenum, vanadium, manganese, niobium, tantalum, chromium and tin.

Typically, the electrocatalyst comprises, preferably consists essentially of, more preferably consists of (or comprises only) a platinum group metal or an alloy of a platinum group metal, preferably with a base metal (preferred base metals as defined above). In particular, the electrocatalyst comprises, preferably consists essentially of, more preferably consists of (or comprises only) platinum or an alloy of platinum with a base metal (preferred base metals as defined above), preferably nickel or cobalt, most preferably nickel. The atomic ratio of platinum to alloying metal is typically in the range of and including 3:1 to 1:3.

The electrocatalyst is dispersed on a support material. Accordingly, it is a supported electrocatalyst and the term "supported" will be readily understood by a skilled person. For example, it will be understood that the term "supported"

includes the electrocatalyst being bound or fixed to the support material by physical or chemical bonds. For instance, the electrocatalyst may be bound or fixed to the support material by way of ionic or covalent bonds, or non-specific interactions such as van der Waals forces.

Preferably, an electrically conductive carbon support material is used which is preferably in powder form. The carbon support material may be, for example, a commercially available carbon black (such as from Cabot Corp. (Vulcan® XC72R)) or Akzo Nobel (the Ketjen® black series)) or a graphitised version of these carbon blacks or other commercially available carbon blacks such as acetylene blacks (e.g. those available from Chevron Phillips (Shawinigan Black®) or Denka). The support material may also be one specifically designed for use in a fuel cell, such as those described in WO2013/045894.

Alternatively, the support material may be a metal oxide or a mixed oxide, in particular a conductive mixed oxide such as niobia-doped titania, phosphorus-doped tin oxide and mixed platinum group metal oxides or mixed metal oxides (as disclosed in WO2012/080726), a carbide (e.g. tungsten carbide, molybdenum carbide or titanium carbide, suitably tungsten carbide or titanium carbide), a nitride, in particular a conductive nitride (e.g. titanium nitride or titanium aluminium nitride).

The electrocatalyst loading in the catalyst material, as well as the catalyst material precursor, may be expressed in terms of weight percent active metal in the electrocatalyst, e.g. platinum group metal, with respect to the total weight of the electrocatalyst and the support material (i.e. excluding any other material, including graphitic carbon nitride, present) which can be determined using inductively coupled plasma mass spectrometry (ICPMS). Accordingly, the loading may suitably be at least 10 wt % active metal, e.g. platinum group metal. The loading of the electrocatalyst may suitably be no more than 90 wt % active metal, e.g. platinum group metal, typically no more than 60 wt % active metal, e.g. platinum group metal, for example no more than 40 wt % active metal, e.g. platinum group metal by total weight of the electrocatalyst and the support material.

Graphitic carbon nitride, also denoted g-$C_3N_4$, is a known and well-studied graphite-like layered material composed of ordered tri-s-triazine, or heptazine sub-units connected through planar tertiary amino groups within a layer and weak van der Waals forces between the layers. Graphitic carbon nitride is prepared by the condensation of precursor compounds, for example aided by sonication and/or heating, including melamine, dicyandiamide, cyanamide, urea, thiourea, and ammonium thiocyanate. The condensation proceeds via a polymeric $C3N_4$ structure called melon, which further condenses to graphitic carbon nitride which has tri-s-triazine units as elementary building blocks.

Figure 2:
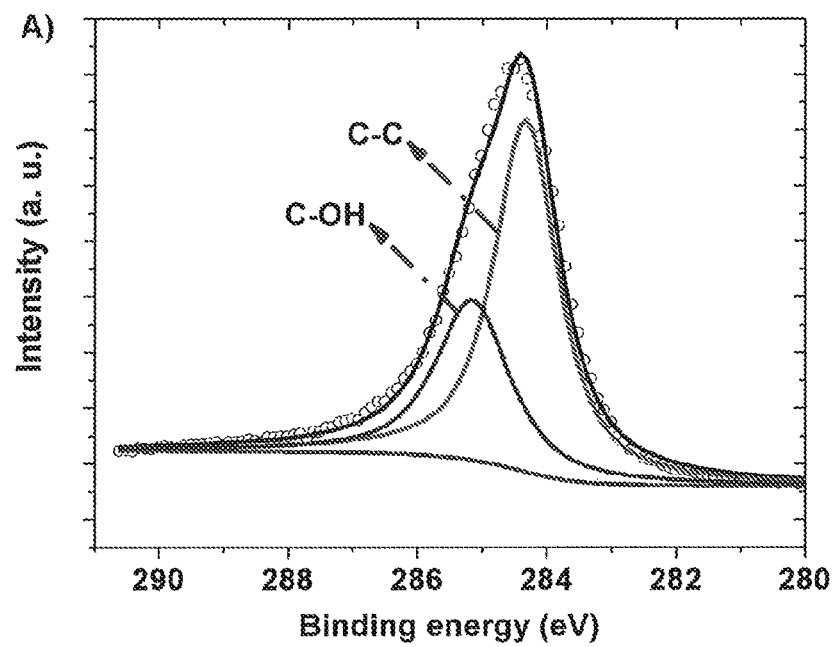
FIGS. 2A and B show deconvoluted X-ray photoelectron spectroscopy (XPS) curves for C1s in the Comparative Example 1 catalyst material (image A), and the Example 1 catalyst material (image B).
Figure 2:
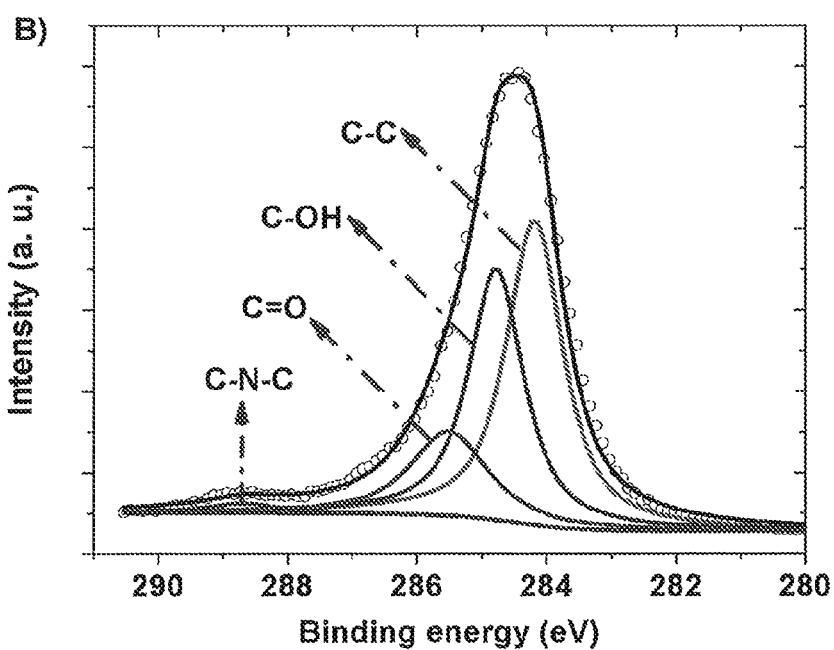

In the present invention, step (ii) may be carried out by contacting the catalyst material precursor with a graphitic carbon nitride precursor compound, preferably a solution of the compound, and applying conditions sufficient to transform, preferably condense (i.e. transform by a condensation reaction), the graphitic carbon nitride precursor to graphitic carbon nitride. Suitably, the graphitic carbon nitride is applied to the catalyst material precursor by mixing the catalyst material precursor with a solution, for example in water, of the desired graphitic carbon nitride precursor which is preferably melamine, dicyandiamide or cyanamide, more preferably cyanamide. Preferably the mixture is sonicated to ensure that the catalyst material precursor is well dispersed in the solution of graphitic carbon nitride. Most preferably, the catalyst material precursor is mixed with a solution of cyanamide in water. The concentration of the graphitic carbon nitride precursor in the solution is not particularly limited and may be, for example, in the range of and including 25 to 75 wt %, for example 50 wt %. A skilled person is aware of conditions sufficient to condense the graphitic carbon nitride precursor to form graphitic carbon nitride. Suitably, the mixture is dried, then fired to a temperature in the range of and including 250 to 750° C., preferably 400 to 600° C., preferably in an inert atmosphere, for example an argon atmosphere, suitably for a time at the required temperature of no more than 10 hours, preferably no more than 5 hours. The mixture is suitably fired at the required temperature for at least 1 hour. The drying step may be carried out, for example, by leaving the mixture in air for a period of at least 12 hours and no more than 48 hours, suitably no more than 36 hours or no more than 24 hours. However, a skilled person will be aware of ways in which to carry out the drying step. The graphitic carbon nitride in the catalyst material of the invention is preferably bonded to the support material by covalent bonds, and as such the method of the invention preferably results in covalent bonding between the graphitic carbon nitride and the support material. Such covalent bonds can be detected, for example, by x-ray photoelectron spectroscopy as shown in FIG. 2 and discussed in the Examples section.

The loading of graphitic carbon nitride is suitably no more than 5 wt % by total weight of the graphitic carbon nitride and the support material (i.e. excluding any other material, including the electrocatalyst, present), preferably no more than 3.5 wt %, more preferably less than 2 wt %. The loading of graphitic carbon nitride is suitably at least 0.5 wt % by total weight of the graphitic carbon nitride and the support material. A skilled person is aware of methods which can be used to determine the elemental make up of a sample and as such the amount of graphitic carbon nitride in the catalyst material. For example, the loading can be determined by a conventional technique such as combusting the sample and analysing the product gases (i.e. combustion analysis), for example using a CHNS/O analyser (e.g., Perkin-Elmer 2400 series) based on a molar ratio of C to N=3:4. In this manner, total N content may be determined, then the content of carbon as graphitic carbon nitride can be calculated based on a molar ratio of C to N=3:4, then the weight of graphitic carbon nitride can be determined. The loading can be controlled by controlling the amount of graphitic carbon nitride precursor used in the method of the invention.

Suitably, the graphitic carbon nitride is dispersed, preferably evenly dispersed, over the surface of the catalyst material. The graphitic nitride is suitably dispersed over least 80%, preferably at least 90%, more preferably at least 95% of the free surface of the support material, i.e. the surface of the support material which does not comprise electrocatalyst. The presence of nitrogen evenly dispersed over the catalyst material can be confirmed by energy-dispersive X-ray spectroscopy (EDS) elemental mapping of transmission electron microscope (TEM) images, as shown in FIG. 1. The formation of graphitic carbon nitride on the catalyst material can be detected, for example, by x-ray analysis, as shown in FIG. 2, and discussed in the Examples section.

The electrocatalyst layer of the invention may be a cathode or an anode, preferably of a fuel cell, more preferably of a proton exchange membrane fuel cell. The characteristics of the electrocatalyst layer, such as the thickness, electrocatalyst loading, porosity, pore size distribution, average pore size and hydrophobicity will depend on whether it is being used at the anode or cathode. In particular, the electrocatalyst layer is for use at the cathode. In an anode, the electrocatalyst layer thickness is suitably at least 1 µm, typically at least 5 µm. In an anode, the electrocatalyst layer thickness is suitably no more than 15 µm, typically no more than 10 µm. In a cathode, the electrocatalyst layer thickness is suitably at least 2 µm, typically at least 5 µm. In a cathode, the electrocatalyst layer thickness is suitably no more than 20 µm, typically no more than 15 µm.

The electrocatalyst loading in the electrocatalyst layer will also depend on the intended use. In this context, electrocatalyst loading means the amount of active metal, e.g. platinum group metal, in the electrocatalyst layer. So, when the electrocatalyst is an alloy of platinum, the electrocatalyst loading is the amount of platinum per unit area expressed as mg/cm$^2$. For example, in a fuel cell cathode containing an electrocatalyst which contains platinum, the electrocatalyst loading is suitably at least 0.05 mgPt/cm$^2$, for example no more than 0.5 mgPt/cm$^2$, preferably no more than 0.3 mgPt/cm$^2$. In a fuel cell anode, the electrocatalyst loading is suitably at least 0.02 mgPt/cm$^2$, for example no more than 0.2 mg/Ptcm$^2$, preferably no more than 0.15 mgPt/cm$^2$.

The electrocatalyst layer of the invention preferably comprises an ion-conducting polymer, such as a proton conducting polymer, to improve the ion-conductivity of the layer. Accordingly, the ion-conducting material may include ionomers such as perfluorosulphonic acid materials (e.g. Nafion® (Chemours Company), Aciplex® (Asahi Kasei), Aquivion® (Solvay Specialty Polymer), Flemion® (Asahi Glass Co.), or ionomers based on partially fluorinated or non-fluorinated hydrocarbons that are sulphonated or phosphonated polymers, such as those available from FuMA-Tech GmbH as the Fumapem® P, E or K series of products, JSR Corporation, Toyobo Corporation, and others. Suitably, the ionomer is a perfluorosulphonic acid, in particular the Nation® range available from Chemours company, especially Nafion® 1100EW, and the Aquivion® range available from Solvay, especially Solvay® 830EW.

The electrocatalyst layer of the invention may comprise additional components. Such components include, but are not limited to: an oxygen evolution catalyst; a hydrogen peroxide decomposition catalyst; a hydrophobic additive (e.g. a polymer such as polytetrafluoroethylene (PTFE) or an inorganic solid with or without surface treatment) or a hydrophilic additive (e.g. a polymer of an inorganic solid, such as an oxide) to control reactant and water transport characteristics. The choice of additional components will depend on whether the electrocatalyst layer is for use at the anode or the cathode and it is within the capability of a skilled person to determine which additional components are appropriate.

To prepare the electrocatalyst layer, the catalyst material of the invention and any additional components are dispersed in an aqueous and/or organic solvent to prepare a catalyst ink. If required, particle break-up is carried out by methods known in the art, such as high shear mixing, milling, ball milling, passing through a microfluidiser etc. or a combination thereof, to achieve a suitable particle size distribution. After preparation of the catalyst ink, the ink is deposited onto a substrate (e.g. gas diffusion layer, ion-conducting membrane or a carrier/transfer substrate) to form the electrocatalyst layer. The ink may be deposited by any suitable technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application.

The electrocatalyst layer may be deposited onto a gas diffusion layer to form a gas diffusion electrode of the invention. The gas diffusion layer comprises a gas diffusion substrate and, preferably, a microporous layer. When a microporous layer is present, the electrocatalyst layer is deposited onto the microporous layer. Typical gas diffusion substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc.), or woven carbon cloths. The carbon paper, web or cloth may be provided with a pre-treatment prior to fabrication of the electrode and being incorporated into a membrane electrode assembly either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. Typical microporous layers comprise a mixture of a carbon black and a polymer such as polytetrafluoroethylene (PTFE).

In the catalyst coated ion-conducting membrane of the invention, the electrocatalyst layer is deposited onto an ion-conducting membrane, either by direct coating of a catalyst ink onto the membrane, or indirectly by transfer from a decal transfer substrate, to form a catalyst coated ion-conducting membrane. The catalyst coated ion-conducting membrane of the invention may comprise a second electrocatalyst layer on its opposite face, which may be in accordance with the invention or otherwise. The ion-conducting membrane may suitably be any membrane suitable for use in a proton exchange membrane fuel cell, for example the membrane may be based on a perfluorinated sulphonic acid material such as Nafion™ (Chemours Company), Aquivion® (Solvay Specialty Polymers), Flemion® (Asahi Glass Group) and Aciplex™ (Asahi Kasei Chemicals Corp.). Alternatively, the membrane may be based on a sulphonated hydrocarbon membrane such as those available from FuMA-Tech GmbH as the Fumapem® P, E or K series of products, JSR Corporation, Toyobo Corporation, and others.

The thickness of the ion-conducting membrane is not particularly limited and will depend on the intended application of the ion-conducting membrane. For example, typical fuel cell ion-conducting membranes have a thickness of at least 5 µm, suitably at least 8 µm, preferably at least 10 µm. Typical fuel cell ion-conducting membranes have a thickness of no more than 50 µm, suitably no more than 30 µm, preferably no more than 20 µm. Accordingly, typical fuel cell ion-conducting membranes have a thickness in the range of and including 5 to 50 µm, suitably 8 to 30 µm, preferably 10 to 20 µm.

The ion-conducting membrane may comprise additional components such as peroxide decomposition catalysts and/or radical decomposition catalysts, and/or recombination catalysts. Recombination catalysts catalyse the recombination of unreacted $H_2$ and $O_2$ which can diffuse into the ion-conducting membrane from the anode and cathode of a fuel cell respectively, to produce water. The ion-conducting membrane may also comprise a reinforcement material, such as a planar porous material (for example expanded polytetrafluoroethylene (ePTFE) as described in USRE37307), embedded within the thickness of the ion-conducting membrane, to provide for improved mechanical strength of the ion-conducting membrane, such as increased tear resistance and reduced dimensional change on hydration and dehydration, and thus further increase the durability of a membrane electrode assembly and lifetime of a fuel cell incorporating the catalysed ion-conducting membrane of the invention. Other approaches for forming reinforced ion-conducting membranes include those disclosed in U.S. Pat. Nos. 7,807,063 and 7,867,669 in which the reinforcement is a rigid polymer film, such as polyimide, into which a number of pores are formed and then subsequently filled with the PFSA ionomer. Graphene particles dispersed in an ion-conducting polymer layer may also be used as a reinforcement material.

Any reinforcement present may extend across the entire thickness of the ion-conducting membrane or may extend across only a part of the thickness of the ion-conducting membrane. It will be understood that the thickness of the ion-conducting membrane extends perpendicular to the face of the ion-conducting membrane, e.g. it is in the through plane z-direction. It may further be advantageous to reinforce the perimeter of the first and second surface of the ion-conducting membrane to a greater extent than the central face of the first and second surface of the ion-conducting membrane. Conversely, it may be desirable to reinforce the centre of the first or second surface of the ion-conducting membrane to a greater extent than perimeter of the first or second surface of the ion-conducting membrane.

When the electrocatalyst layer is deposited onto a decal transfer substrate, by coating of a catalyst ink onto the decal transfer substrate, it forms a catalysed decal transfer substrate of the invention. Additional layers may be deposited on the exposed face of the electrocatalyst layer prior to removal of the decal transfer substrate; for example, an ion-conducting ionomer layer may be applied from a dispersion of ionomer using any suitable deposition technique known as described above in relation to deposition of the electrocatalyst layer. Further additional layers can be added as required, for example as described in PCT publication WO 2015/145128. The decal transfer substrate is removed from the electrocatalyst layer at an appropriate time. The decal transfer substrate may be formed from any suitable material from which the electrocatalyst layer can be removed without damage. Examples of suitable materials include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene) and polyolefins, such as biaxially oriented polypropylene (BOPP).

As a skilled person will understand, the membrane electrode assembly of the invention can be constructed by a number of methods, providing it contains at least one electrocatalyst layer of the invention. For example, the membrane electrode assembly may comprise an ion-conducting membrane of the invention which comprises two electrocatalyst layers at least one of which is an electrocatalyst layer of the invention, with a gas diffusion layer applied to each electrocatalyst layer. Alternatively, the membrane electrode assembly may comprise an ion-conducting membrane sandwiched between two gas diffusion electrodes, at least one which is a gas diffusion electrode of the invention. The membrane electrode assembly may also comprise a catalyst coated ion-conducting membrane with one electrocatalyst layer, and on the opposite face of the ion-conducting membrane a gas diffusion electrode in which either or both of the electrocatalyst layer and the gas diffusion electrode are of the invention.

The fuel cell of the invention is preferably a proton exchange membrane fuel cell.

EXAMPLES

Preparation of Catalyst Materials
Example 1: Platinum electrocatalyst (20 wt %), g-$C_3N_4$ (0.75 wt %), on a carbon black support (Vulcan® XC72R).
Example 2: Platinum electrocatalyst (20 wt %), g-$C_3N_4$ (1.4 wt %), on a carbon black support (Vulcan® XC72R).
Example 3: Platinum electrocatalyst (20 wt %), g-$C_3N_4$ (1.9 wt %), on a carbon black support (Vulcan® XC72R).
Example 4: Platinum electrocatalyst (20 wt %), g-$C_3N_4$ (3.1 wt %), on a carbon black support (Vulcan® XC72R).
Comparative Example 1: Platinum electrocatalyst (20 wt %) on a carbon black support (Vulcan® XC72R).
g-$C_3N_4$=graphitic carbon nitride.

For platinum electrocatalyst, the wt % quoted is with respect to the total weight of the platinum electrocatalyst and the carbon black support. For the graphitic carbon nitride, the wt % quoted is with respect to the total weight of the graphitic carbon nitride and the carbon black support.

For Examples 1 to 4, g-$C_3N_4$@Pt(20 wt %) NPs/VC (g-$C_3N_4$=graphitic carbon nitride, NP=nanoparticles, VC=Vulcan® XC72R carbon powder from Cabot Corporation) samples were synthesized using Pt(20 wt %) NPs/VC as the catalyst material precursor and cyanamide (50 wt % in $H_2O$, Sigma-Aldrich) as the graphitic carbon nitride precursor. For Example 1, 100 mg of Pt(20 wt %) NPs/VC was mixed with 0.1 mL of cyanamide solution and 9.9 mL of $H_2O$, and ultrasonicated for 20 min. After storage at ambient conditions overnight, the mixture was left in air to dry, and then heated at 550° C. in Ar for 3 h to generate g-$C_3N_4$@Pt(20 wt %) NPs/VC. For the synthesis of Examples 2, 3, and 4, 0.2 mL, 0.3 mL, and 0.5 mL of cyanamide solution were employed respectively.

Comparative Example 1 is Pt(20 wt %) NPs/VC, which is the same as the catalyst material precursor used to prepare Examples 1 to 4.

Pt(20 wt %) NPs/VC is a particulate carbon supported nanoparticle material prepared using a method analogous to the general method of preparation of carbon supported catalysts described in WO2013/045894, using Vulcan® XC72R carbon powder from Cabot Corporation.

Material Characterisation

Scanning electron microscopy (SEM) images were obtained with a FEI Helios NanoLab 650 FIB (focused ion beam)-SEM.

Energy-dispersive X-ray spectroscopy (EDS) elemental mapping and transmission electron microscope (TEM) imaging were conducted with a FEI Tecnai G2 microscope operated at 200 kV.

The amounts of C and N were determined by combustion analysis using a CHNS/O analyser (Perkin-Elmer 2400 series), and the contents of g-$C_3N_4$ in the samples were calculated based on a molar ratio of C to N=3:4.

X-ray photoelectron spectroscopy (XPS) analyses were conducted in a Leybold MAX200 spectrometer using a Mg Kα source (1253.6 eV) operated at 15 kV and 20 mA. All binding energies were corrected for sample charging by referencing to the adventitious C 1s peak at 285.0 eV.

Electrochemical Measurements

Half-Cell Measurements

An electrochemical half-cell, operating with gaseous oxygen feed, was used for the electrocatalytic activity evaluation of the catalyst materials. This cell enables operation at high current densities (ca. 2 A cm$^{-2}$) hence allowing the users to mimic the practical fuel cell working environment.

Components and the setup of the half-cell are described in B. Pinaud, et al. *Key considerations for high current fuel cell catalyst testing in an electrochemical half-cell*, J. Electrochem. Soc., 2017, 164, F321-F327. In brief, a large platinum gauze (52 mesh, 99.9%, Alfa Aesar) and platinum wire (0.5 mm diameter, 99.95%, Alfa Aesar) were utilized to fabricate a flag counter electrode with a high surface area. An Hg/Hg$_2$SO$_4$ (filled with 0.5 M H$_2$SO$_4$ solution) electrode was used as the reference electrode. A catalyst-coated gas diffusion electrode with a microporous layer (Sigracet 29BC) was used as the working electrode, which has an exposed active surface area of 1.91 cm$^2$. The electrocatalyst loading on the working electrode was set as 0.1 mgPt cm$^{-2}$, and the actual electrocatalyst loading was determined by ICP-OES analysis. The electrolyte consisted of 1 M perchloric acid (HClO$_4$). All half-cell measurements were carried out at ambient temperature (ca. 20° C.) to minimize safety risks associated with hot HClO$_4$ and to prevent loss of electrolyte due to evaporation. A glass frit (Ace dispersion tube, porosity D, Sigma-Aldrich) was used to purge the cell electrolyte and the head-space with either Ar or O$_2$. All gases were delivered at a pressure of 1 atm (101 kPa absolute) and had a purity of 99.99% or higher. A potentiostat (5A board, Bio-Logic VMP3) was used for potential control and data acquisition. The reference electrode was regularly calibrated to the reversible hydrogen electrode (RHE) in each electrolyte concentration, and unless otherwise specified, all potentials are reported with respect to the RHE scale.

Figure 4:
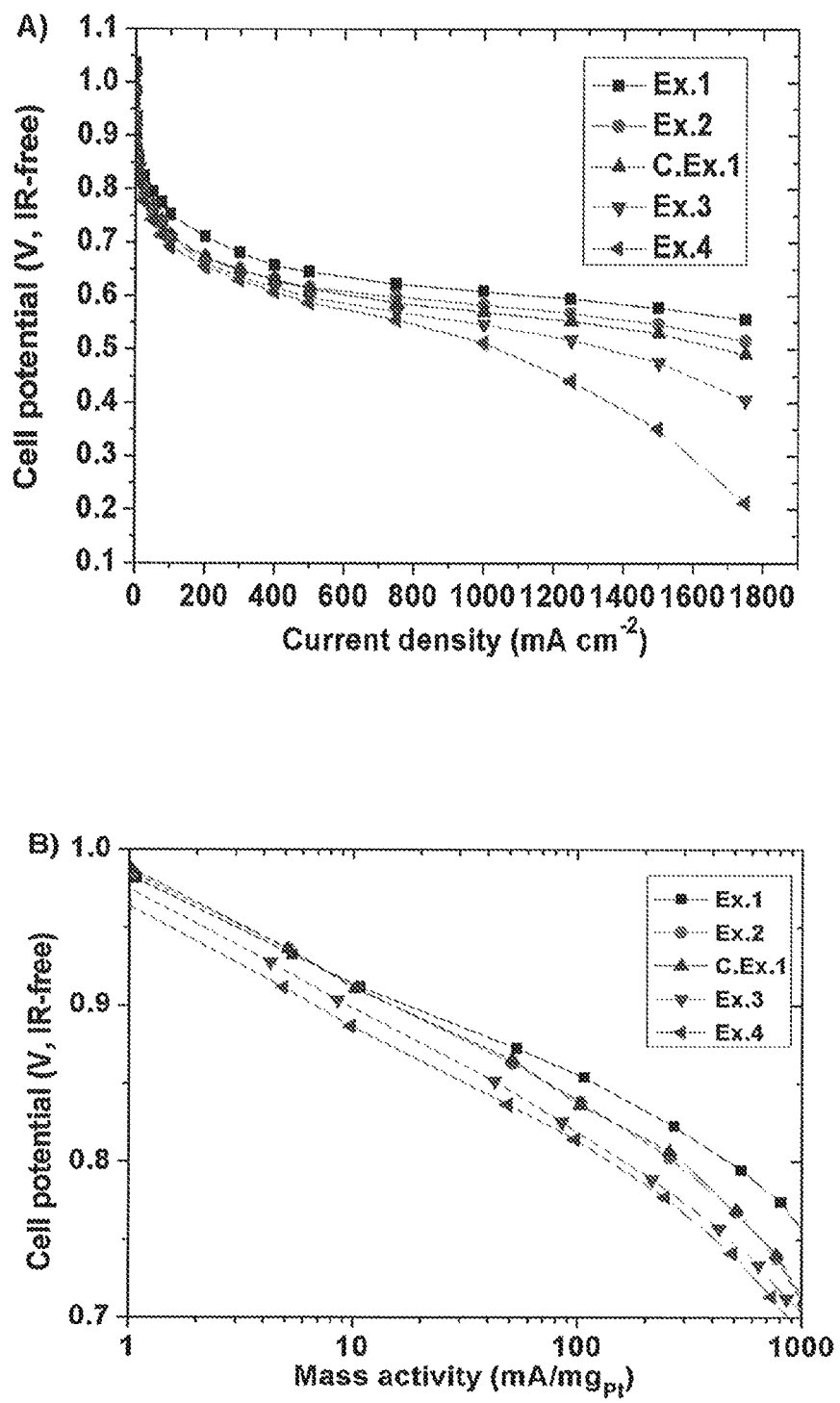
FIG. 4A shows a plot of cell potential v current density from half-cell tests performed on a gas diffusion electrode containing the Comparative Example 1 catalyst material, as well as gas diffusion electrodes containing the catalyst materials of Examples 1 to 4.
FIG. 4B shows a plot of cell potential v mass activity from half-cell tests performed with a pure oxygen feed on a gas diffusion electrode containing the Comparative Example 1 catalyst material, as well as gas diffusion electrodes containing the catalyst materials of Examples 1 to 4.
Figure 5:
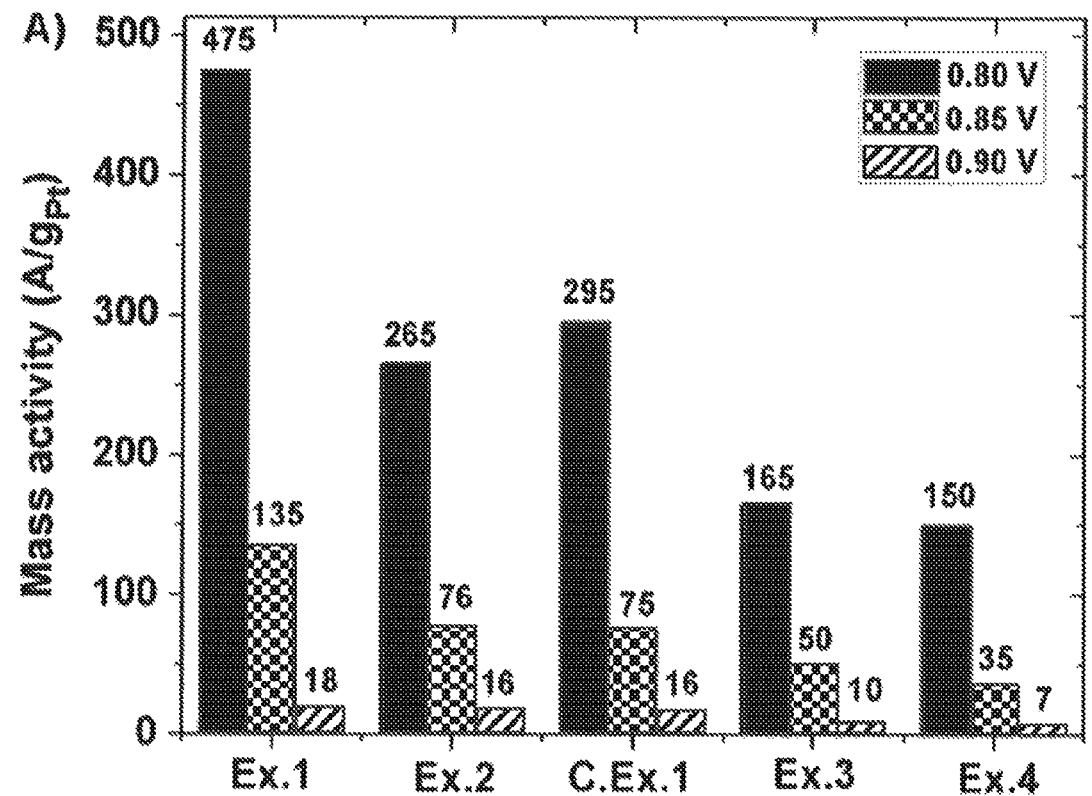
FIG. 5A is a bar chart showing mass activity determined from half-cell tests for a gas diffusion electrode containing the Comparative Example 1 catalyst material, as well as gas diffusion electrodes containing the catalyst materials of Examples 1 to 4.
FIG. 5B is a bar chart showing specific activity determined from half-cell tests for a gas diffusion electrode containing the Comparative Example 1 catalyst material, as well as gas diffusion electrodes containing the catalyst materials of Examples 1 to 4.
Figure 5:
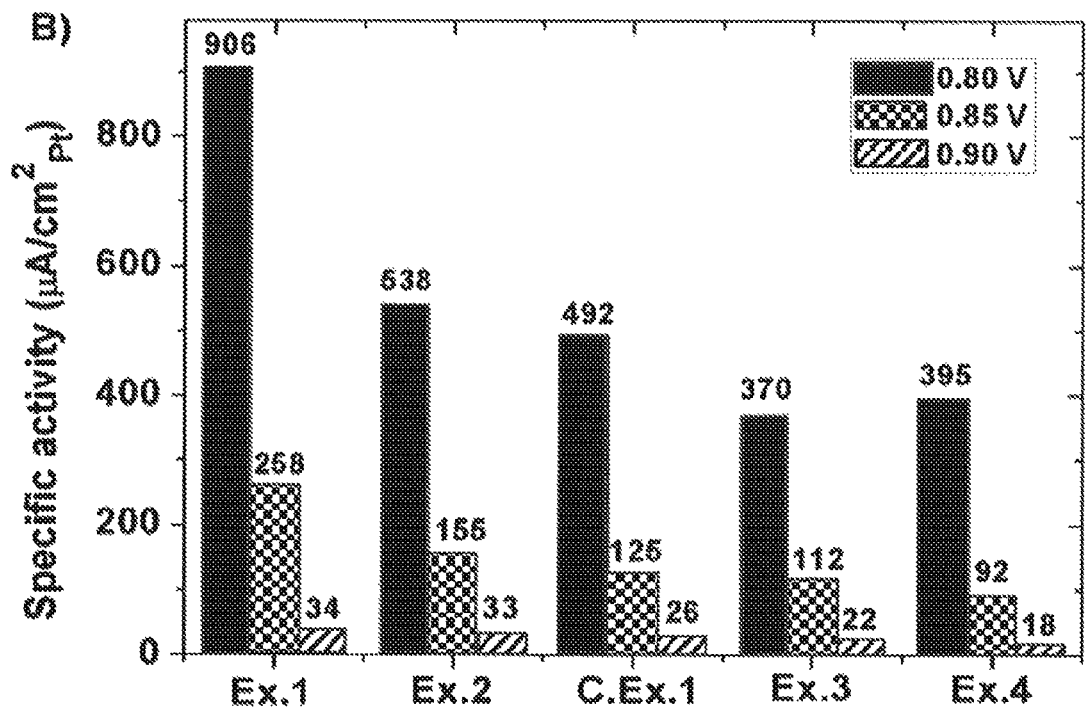

Mass activity (mA/mgPt) data shown in FIG. 5A were taken directly from FIG. 4B at the various cell potentials (i.e., 0.80, 0.85, 0.90 V). Mass activity was calculated by using the data shown in FIG. 4A in the low current density region (0 to 100 mA/cm$^2$). For the calculations, the catalyst-coated gas diffusion electrodes for half-cell tests were assumed to have the same exposed active surface area of 1.91 cm$^2$. In addition, the actual Pt loading in the catalyst-coated gas diffusion electrodes was determined by ICP-OES. Based on these parameters, the current density (mA/cm$^2$) shown in FIG. 4A can be readily converted to the mass activity (mA/mgPt) shown in FIG. 4B. Specific activity data (mA/cm$^2$) data shown in FIG. 5B were derived from the mass activity (mA/mgpt) data shown in FIG. 5A divided by the electrochemical surface area (ECSA, cm$^2$/mgpt) of each catalyst material. Electrochemical surface area (ECSA) was determined from the integrated charge (after subtraction of the capacitance contribution) in the hydrogen adsorption region of the steady state CV curves, based on a monolayer hydrogen adsorption charge of 0.21 mC cm$^{-2}$ on polycrystalline platinum. Cyclic voltammogram (CV) measurements were conducted at room temperature at 20 mV s$^{-1}$ in Ar-purged 0.1 M HClO$_4$. All cyclic voltammograms (CVs) are 100% IR-corrected (95% in-situ compensation and 5% in post-processing) by measuring the resistance at open circuit at f=10 KHz. Details of the IR-correction procedure for constant current polarization curves are described in reference B. Pinaud, et al. *Key considerations for high current fuel cell catalyst testing in an electrochemical half-cell*, J. Electrochem. Soc., 2017, 164, F321-F327.

Single-Cell Measurements

A membrane electrode assembly of 50 cm$^2$ total area and 14 cm$^2$ active area was prepared by applying a cathode gas diffusion electrode and an anode gas diffusion electrode onto either face of a perfluorosulphonic acid (PFSA) reinforced membrane. The non-active area was masked. The cathode gas diffusion electrode comprised the catalyst materials of the Examples and Comparative Example at a platinum loading of 0.16 mg/cm$^2$ in a catalyst layer with PFSA ionomer on a Sigracet 29BC gas diffusion layer. The anode gas diffusion electrode comprised an anode electrocatalyst (HiSPEC® 3000 with a nominal platinum loading of 20 wt % on the carbon support) at a loading of 0.04 mg/cm$^2$ in a catalyst layer with PFSA ionomer on a Sigracet 29BC gas diffusion layer.

For single-cell measurements, a 50 cm$^2$ Screener Cell was used operating at 100% relative humidity on both anode and cathode, the area greater than the 14 cm$^2$ being masked. The anode was fed with H$_2$ (stoichiometry 1.5) and the cathode was fed with O$_2$ or air (stoichiometry 2). The cell temperature was 80° C., the cell compression was 80 psi, and the cell gas pressure was 150 kPa for the anode and cathode.

Results and Discussion

FIG. 1 shows the location of the platinum (images D and E) and nitrogen (images C and E) in the Example 1 catalyst material after the deposition of graphitic carbon nitride, using EDS elemental mapping. The data showed that nitrogen, and as such the graphitic carbon nitride, is evenly dispersed over the catalyst material. In the original data, nitrogen is represented by green and platinum is represented by red. The original data shows an even dispersion of green and red over the carbon support material.

The deconvoluted XPS curves in FIG. 2 show that new C=O and graphitic carbon nitride C—N—C bonds have been generated after the application of graphitic carbon nitride. FIG. 2A is data from the Comparative Example 1 catalyst material, and FIG. 2B is data from the Example 1 catalyst material. Accordingly, it is evident that the method of the invention results in the presence of graphitic carbon nitride, and that the graphitic carbon nitride is covalently bonded to the support material.

Figure 3:
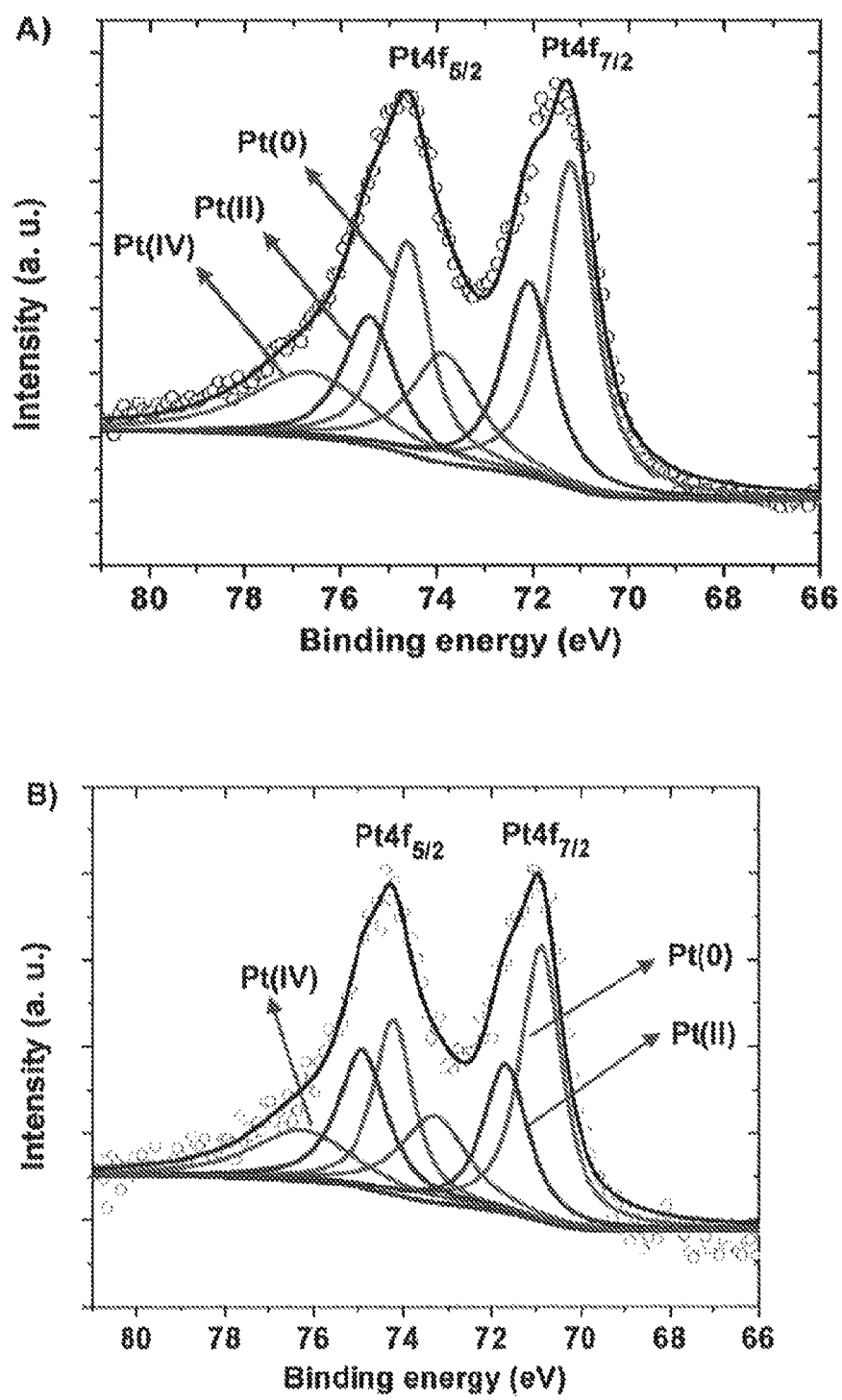
FIGS. 3A and B shows deconvoluted XPS curves for Pt 4f in the Comparative Example 1 catalyst material (image A), and the Example 1 catalyst material (image B).

The deconvoluted XPS curves in FIG. 3 show that the predominant platinum species are Pt(0) for both the Comparative Example 1 catalyst material (FIG. 3A) and the Example 1 catalyst material (FIG. 3B). Specifically, according to the areas enclosed by the peaks of Pt(0), Pt(II) and Pt(IV), the percentage of each Pt species (i.e., Pt(0), Pt(II) and Pt(IV)) in the sample can be calculated. The predominant platinum species are Pt(0) (neither Pt(II) nor Pt(IV)) for both samples, implying that the method of the invention does not change the nature of the platinum electrocatalyst. This is advantageous because, for example, if the predominant platinum species changed from Pt(0) to Pt(II) or Pt(IV), the electrocatalytic activity of the electrocatalyst may decrease significantly.

The half-cell determined polarisation and mass activity curves shown in FIGS. 4A and B respectively show that there is maximum graphitic carbon nitride for better performance of the Example 1 to 4 catalyst materials that the Comparative Example 1 catalyst material. At high current densities, a loading of less than 2 wt % with respect to the total weight of the graphitic carbon nitride and the carbon black support (i.e. Examples 1 and 2) gives electrochemical performance than the Comparative Example 1 catalyst material. The mass activity and specific activity data in FIGS. 5A and 5B show a similar trend.

Figure 6:
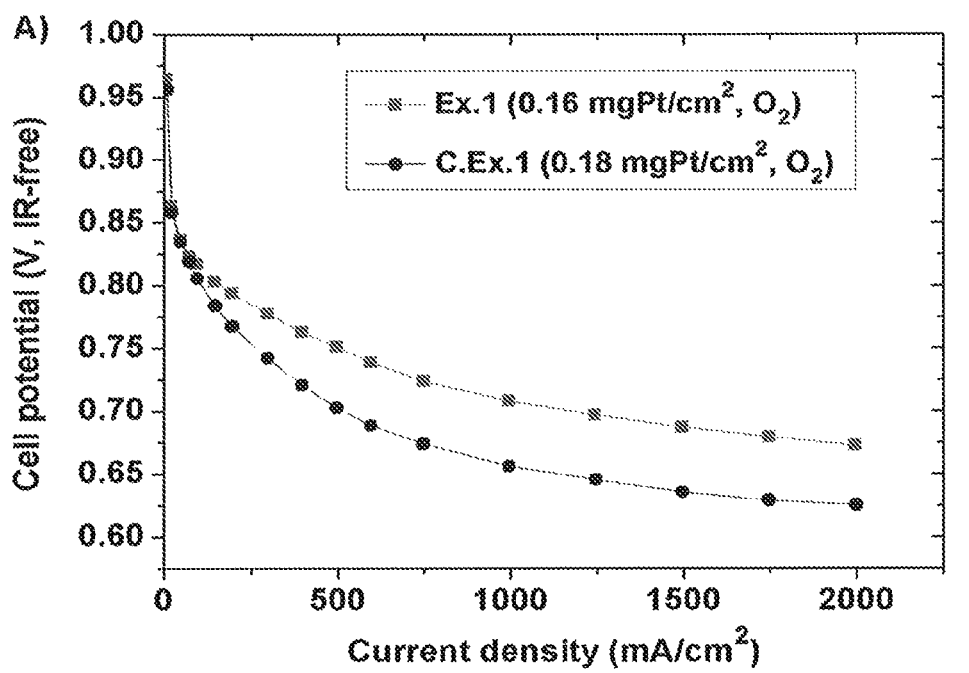
FIG. 6A shows a plot of cell potential v current density from single-cell tests performed on a membrane electrode assembly containing the Comparative Example 1 catalyst material, as well as a membrane electrode assembly containing the Example 1 catalyst material, corrected for internal resistance. The cathode was supplied with pure oxygen.
FIG. 6B shows a plot of potential v current density from single-cell tests performed on a membrane electrode assembly containing the Comparative Example 1 catalyst material, as well as a membrane electrode assembly containing the Example 1 catalyst material, corrected for internal resistance. The cathode was supplied with air.
Figure 6:
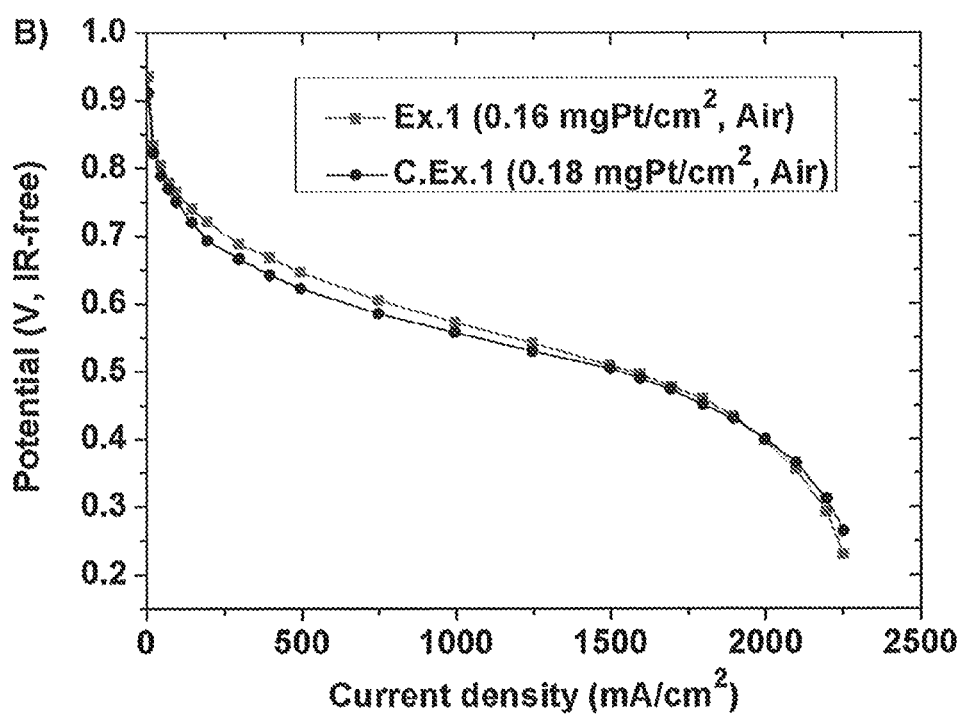

The single-cell test polarisation curves for the Comparative Example 1 and Example 1 catalyst materials shown in FIGS. 6A and B demonstrate the surprising increase in electrochemical performance of catalyst materials of the invention as compared with a conventional catalyst material. The increased performance visible under $O_2$ (where the reaction is under kinetic control) shown in FIG. 6A shows the increased catalytic activity per se of the catalyst materials of the invention. In FIG. 6B, which is under air, this increased catalytic activity is evident at low current density whereby kinetic control still prevails.

The invention claimed is:

1. A method of preparing catalyst material which comprises electrocatalyst particles, a support material, and graphitic carbon nitride, said method comprising the steps of:
   (i) providing a catalyst material precursor comprising electrocatalyst particles dispersed on a support material, wherein the catalyst material precursor does not comprise graphitic carbon nitride; then
   (ii) applying graphitic carbon nitride to the catalyst material precursor provided in step (i) by contacting the catalyst material precursor with a graphitic carbon nitride precursor compound and applying conditions to transform the graphitic carbon nitride precursor to graphitic carbon nitride.

2. The method according to claim 1, wherein the catalyst material comprises no more than 5 wt % of graphitic carbon nitride by total weight of the graphitic carbon nitride and the support material.

3. The method according to claim 1, wherein the catalyst material comprises electrocatalyst particles, a support material, and graphitic carbon nitride, wherein the electrocatalyst particles are dispersed on the support material, and wherein the catalyst material comprises no more than 5 wt % of graphitic carbon nitride by total weight of the graphitic carbon nitride and the support material.

4. The method of claim 1, wherein loading of graphitic carbon nitride on the support material is no more than 5 wt % by total weight of the graphitic nitride and the support material.

5. The method of claim 1, wherein loading of graphitic carbon nitride on the support material is no more than 2 wt % by total weight of the graphitic nitride and the support material.

6. The method of claim 1, wherein the graphitic carbon nitride is dispersed over at least 80% of a free surface of the support material.

7. The method of claim 1, wherein the conditions comprise heating to a temperature of 250° C. to 750° C.

* * * * *